(12) United States Patent
Kariya et al.

(10) Patent No.: US 9,893,993 B2
(45) Date of Patent: Feb. 13, 2018

(54) RELAY DEVICE AND RELAY SYSTEM

(71) Applicant: Hitachi Metals, Ltd., Minato-ku, Tokyo (JP)

(72) Inventors: Kazutoshi Kariya, Tsuchiura (JP); Shingo Sugawara, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 81 days.

(21) Appl. No.: 15/019,054

(22) Filed: Feb. 9, 2016

(65) Prior Publication Data

US 2017/0093711 A1 Mar. 30, 2017

(30) Foreign Application Priority Data

Sep. 29, 2015 (JP) ................. 2015-191551

(51) Int. Cl.
| | |
|---|---|
| *H04L 12/28* | (2006.01) |
| *H04L 12/56* | (2006.01) |
| *H04L 12/741* | (2013.01) |
| *H04L 12/18* | (2006.01) |
| *H04L 12/46* | (2006.01) |
| *H04L 12/705* | (2013.01) |

(52) U.S. Cl.
CPC ............. *H04L 45/74* (2013.01); *H04L 12/18* (2013.01); *H04L 12/4625* (2013.01); *H04L 12/4645* (2013.01); *H04L 45/18* (2013.01)

(58) Field of Classification Search
CPC ..... H04L 45/74; H04L 12/4645; H04L 45/18; H04L 12/18
USPC .......................................... 370/392, 389, 390
See application file for complete search history.

(56) References Cited

U.S. PATENT DOCUMENTS

| | | | |
|---|---|---|---|
| 8,724,638 B1 * | 5/2014 | Carrie ................. | H04L 12/4641 370/395.53 |
| 9,742,588 B2 * | 8/2017 | Carrie .................. | H04L 12/467 |
| 2008/0186981 A1 | 8/2008 | Seto et al. | |
| 2011/0007744 A1 * | 1/2011 | Melman .............. | H04L 12/4625 370/392 |
| 2012/0106553 A1 * | 5/2012 | Melman .............. | H04L 12/4625 370/392 |
| 2013/0329547 A1 * | 12/2013 | Takase ................ | H04L 41/0654 370/220 |
| 2014/0169382 A1 * | 6/2014 | Melman .............. | H04L 12/4625 370/401 |
| 2014/0341223 A1 * | 11/2014 | Carrie ................. | H04L 12/4641 370/395.53 |
| 2014/0347977 A1 * | 11/2014 | Shigeeda ............... | H04L 12/42 370/219 |

FOREIGN PATENT DOCUMENTS

JP 2008-193614 A 8/2008

* cited by examiner

*Primary Examiner* — Chuong T Ho
(74) *Attorney, Agent, or Firm* — Crowell & Moring LLP

(57) ABSTRACT

An LP table retains a combination of a physical port and a VLAN identifier in association with a logical port. When a frame is received at the physical port, a table processing unit acquires a logical port based on the LP table. An FDB processing unit learns a source MAC address contained in the received frame in association with the logical port acquired by the table processing unit to an FDB. A plurality of logical ports are set for the physical port by the LP table. A loop prevention unit prohibits frame relay between the plurality of logical ports set for the physical port.

5 Claims, 14 Drawing Sheets

FIG. 3A
21: LP TABLE (SW1)

| PHYSICAL PORT ID | VID | LOGICAL PORT ID |
|---|---|---|
| {PPh1} | BVID1 | {LP1_1} |
| {PPh1} | BVID2 | {LP1_2} |
| {PPh2} | SVID1 | {LP2_1} |
| ... | ... | ... |

FIG. 3B
22: VID CONVERSION TABLE (SW1)

| IVID | SVID | BVID | ISID |
|---|---|---|---|
| IVID1 | SVID1 | --- | --- |
| IVID1 | --- | BVID1 | ISID1 |
| IVID1 | --- | BVID2 | ISID1 |
| ... | ... | ... | ... |

FIG. 3C
FDB(SW1)

| MAC ADDRESS | IVID | LOGICAL PORT ID |
|---|---|---|
| MA1 | IVID1 | {LP2_1} |
| MA2 | IVID1 | {LP1_1} |
| MA3 | IVID1 | {LP1_2} |
| ... | ... | ... |

FIG. 3D
23: MC TABLE (SW1)

| IVID | LOGICAL PORT ID |
|---|---|
| IVID1 | {LP1_1}, {LP1_2}, {LP2_1} |
| ... | ... |

FIG. 10A

23a: LC TABLE

| IVID | LCID |
|---|---|
| IVID1 | {LCh1},{LCh2} |
| ... | ... |

FIG. 10B

23b: PORT TABLE

| IVID | LOGICAL PORT ID /PHYSICAL PORT ID |
|---|---|
| IVID1 | {LP1_1},{LP1_2} |
| ... | ... |

FIG. 10C

FDB

| CMAC ADDRESS | BMAC ADDRESS | IVID | LOGICAL PORT ID /PHYSICAL PORT ID |
|---|---|---|---|
| xxx | xxx | xxx | xxx |

21:LP TABLE

| PHYSICAL PORT ID | VID | LOGICAL PORT ID |
|---|---|---|
| {PPh1} | VID1,VID2 | {LP1} |
| {PPh1} | VID3 | {LP2} |
| ... | ... | ... |

FDB

| MAC ADDRESS | LOGICAL PORT ID |
|---|---|
| MA1 | {LP1} |
| MA2 | {LP1} |
| MA3 | {LP2} |
| ... | ... |

RELAY DEVICE AND RELAY SYSTEM

CROSS-REFERENCE TO RELATED APPLICATION

The present application claims priority from Japanese Patent Application No. 2015-191551 filed on Sep. 29, 2015, the content of which is hereby incorporated by reference into this application.

TECHNICAL FIELD OF THE INVENTION

The present invention relates to a relay device and a relay system, for example, a relay system made up of a full-mesh network and a relay device used in the relay system.

BACKGROUND OF THE INVENTION

For example, Japanese Patent Application Laid-Open Publication No. 2008-193614 (Patent Document 1) describes a method in which VLAN-IDs are managed by dividing them into sub-group IDs and sub-IDs included therein. In this method, ports to which the same sub-group ID is allocated belong to the same flooding domain, but whether relay between the ports therein is possible is determined based on the sub-IDs.

SUMMARY OF THE INVENTION

For example, a full-mesh network in which relay devices are connected in a full mesh has been known as one of network topologies. When three relay devices are provided, for example, each of the three relay devices is connected to the remaining two relay devices through respectively different physical ports and communication lines.

In such a network, for example, an advantage that one hop relay is possible between the respective relay devices can be obtained, but there are mainly two concerns in the construction of the network. The first concern is that the cost may increase due to the increase in the number of required physical ports and communications lines. The second concern is that a loop path may be created when relaying, for example, a multicast frame.

The present invention has been made in view of such problems, and an object thereof is to provide a relay device and a relay system capable of constructing a full-mesh network at low cost.

The above and other objects and novel characteristics of the present invention will be apparent from the description of the present specification and the accompanying drawings.

The following is a brief description of an outline of the representative embodiment of the invention disclosed in the present application.

A relay device according to an embodiment includes: a physical port; a logical port table; a table processing unit; an FDB; an FDB processing unit; and a loop prevention unit. The logical port table retains a combination of the physical port and a VLAN identifier in association with a logical port. The table processing unit acquires the logical port based on the logical port table when a frame is received at the physical port. The FDB processing unit learns a source MAC address contained in the received frame in association with the logical port acquired by the table processing unit to the FDB. Here, a plurality of the logical ports are set for the physical port by the logical port table. The loop prevention unit prohibits frame relay between the plurality of logical ports set for the physical port.

The advantages obtained by the representative embodiment of the invention disclosed in the present application will be briefly described as follows. That is, it is possible to construct a full-mesh network at low cost in a relay device and a relay system.

BRIEF DESCRIPTIONS OF THE DRAWINGS

FIG. 3A is a schematic diagram illustrating a configuration example of a logical port table of FIG. 2;

FIG. 3B is a schematic diagram illustrating a configuration example of a VID conversion table of FIG. 2;

FIG. 3C is a schematic diagram illustrating a configuration example of an FDB of FIG. 2;

FIG. 3D is a schematic diagram illustrating a configuration example of a multicast table of FIG. 2;

FIG. 10A is a schematic diagram illustrating a configuration example of an LC table of FIG. 9;

FIG. 10B is a schematic diagram illustrating a configuration example of a port table of FIG. 9;

FIG. 10C is a schematic diagram illustrating a configuration example of an FDB of FIG. 9;

DESCRIPTIONS OF THE PREFERRED EMBODIMENTS

Figure 1:
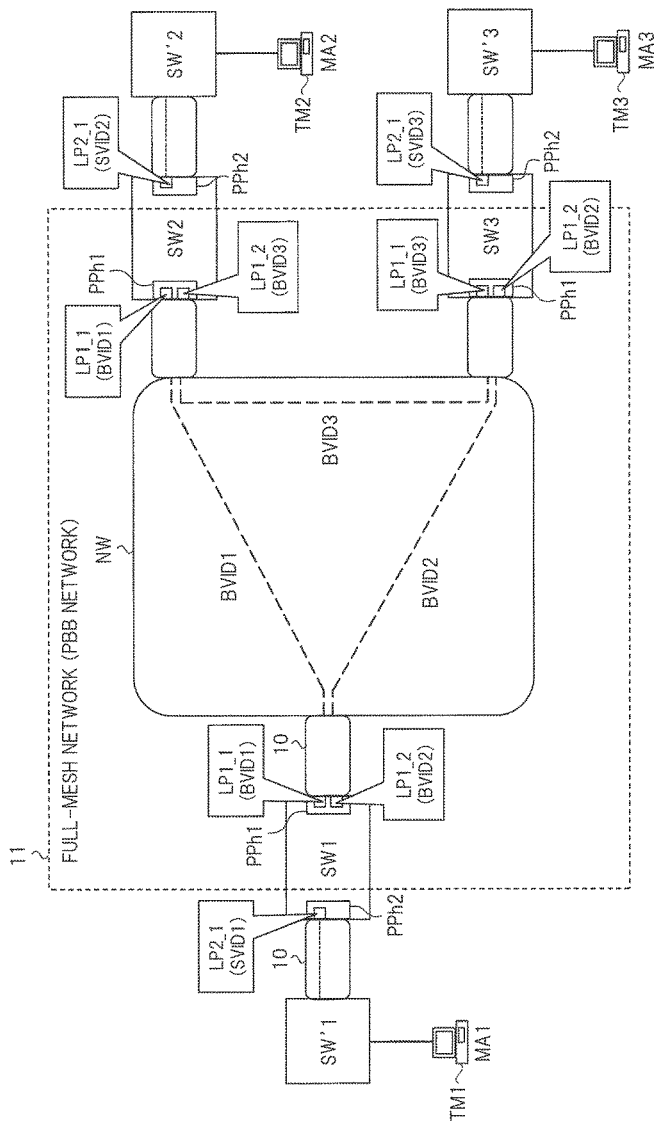
FIG. 1 is a schematic diagram illustrating a configuration example of main components in a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

<<Logical Port Function>>

Figures 13A, 13B, 13C:
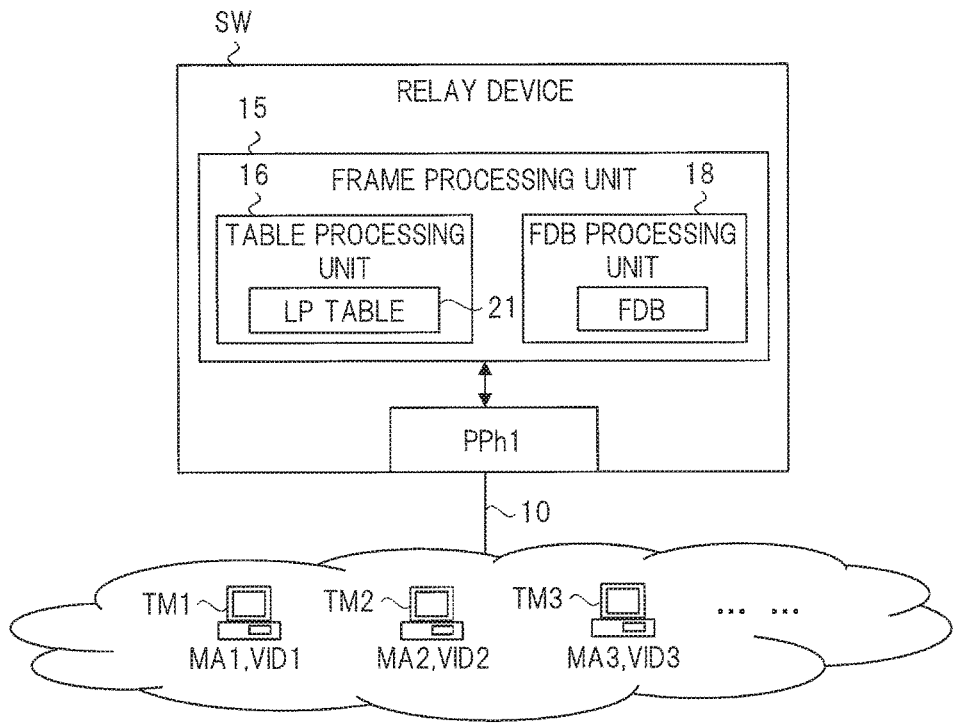
FIG. 13A is a block diagram illustrating a schematic configuration example of main components relating to a logical port in the relay device according to the first embodiment of the present invention.
FIG. 13B is a schematic diagram illustrating a configuration example of a logical port table of FIG. 13A.
FIG. 13C is a schematic diagram illustrating a configuration example of an FDB of FIG. 13A.
Figures 14A, 14B:
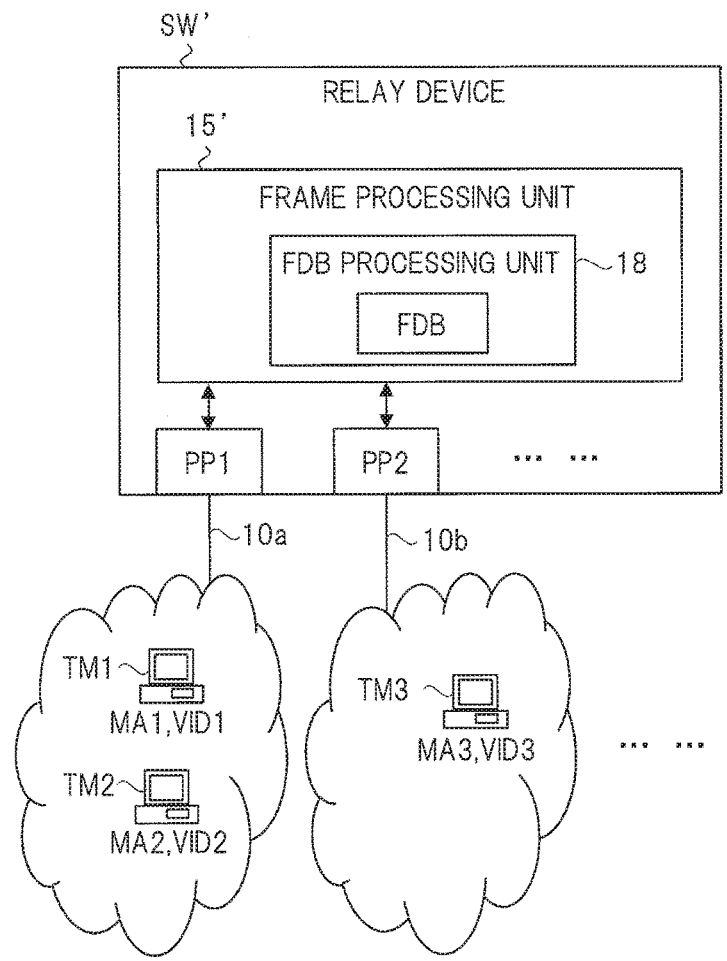
FIG. 14A is a block diagram illustrating a schematic configuration example of main components of a relay device to be a comparative example of FIG. 13A.
FIG. 14B is a schematic diagram illustrating a configuration example of an FDB of FIG. 14A.

The relay device according to the first embodiment is assumed to have a function referred to as a logical port. First, a concept of the logical port and a basic configuration for realizing the logical port will be described. FIG. 13A is a block diagram illustrating a schematic configuration example of main components relating to a logical port in the relay device according to the first embodiment of the present invention, FIG. 13B is a schematic diagram illustrating a configuration example of a logical port table of FIG. 13A, and FIG. 13C is a schematic diagram illustrating a configuration example of an FDB of FIG. 13A. FIG. 14A is a block diagram illustrating a schematic configuration example of main components of a relay device to be a comparative example of FIG. 13A, and FIG. 14B is a schematic diagram illustrating a configuration example of an FDB of FIG. 14A.

First, a relay device SW' of the comparative example illustrated in FIG. 14A includes a plurality of physical ports PP1, PP2, . . . , and a frame processing unit 15'. The frame processing unit 15' includes an FDB (Forwarding DataBase) and an FDB processing unit 18 which performs learning and retrieval of the FDB. In the example of FIG. 14A, terminals TM1 and TM2 are present ahead of a communication line 10a connected to the physical port PP1 and a terminal TM3 is present ahead of a communication line 10b connected to the physical port PP2. The terminals TM1, TM2 and TM3 have the MAC addresses "MA1", "MA2" and "MA3", respectively, and VLAN identifiers "VID1", "VID2" and "VID3" are respectively allocated thereto.

In this case, as illustrated in FIG. 14B, a port identifier {PP1} is learned in association with "MA1" and "VID1" to the FDB. The port identifier {PP1} indicates the identifier (ID) of the physical port PP1, and for example, {AA} is supposed to indicate the identifier of "AA" in the same manner in the present specification. Further, the port identifier {PP1} is learned in association with "MA2" and "VID2" and a port identifier {PP2} is learned in association with "MA3" and "VID3" to the FDB of FIG. 14B.

A relay device SW illustrated in FIG. 13A realizes a configuration equivalent to the relay device SW' of FIG. 14A by the logical port function. Though not particularly limited, the relay device SW illustrated in FIG. 14A is a layer 2 (L2) switch or the like for performing an L2 processing of an OSI reference model, and includes a physical port PPh1 and a frame processing unit 15. The frame processing unit 15 includes a logical port table (hereinafter, abbreviated as LP table below) 21, a table processing unit 16 for performing processing based on the LP table, an FDB, and the FDB processing unit 18 for performing learning and retrieval of the FDB.

In the example of FIG. 13A, unlike the case of FIG. 14A, the terminals TM1, TM2 and TM3 similar to those in FIG. 14A are present ahead of a communication line 10 connected to the physical port PPh1. In this case, the LP table 21 previously retains combinations of the one physical port PPh1 and one or a plurality of VLAN identifiers in association with one logical port based on the user setting as illustrated in FIG. 13B. Specifically, the LP table 21 retains a combination of the port identifier {PPh1} and the VLAN identifiers "VID1" and "VID2" in association with the logical port LP1 (port identifier {LP1}), and retains a combination of the port identifier {PPh1} and the VLAN identifier "VID3" in association with the logical port LP2 (port identifier {LP2}).

The logical port LP is a port equivalent to the physical port PP1 of FIG. 14A, and the logical port LP2 is a port equivalent to the physical port PP2 of FIG. 14A. In this way, the logical ports provide a mechanism for virtually mounting a plurality of physical ports on the one physical port PPh1. If there are ten physical ports and a bandwidth of each physical port is 10 Gbps in FIG. 14A, this configuration can be replaced with the configuration of FIG. 13A by, for example, providing the physical port PPh1 having a bandwidth of 100 Gbps and then providing ten logical ports on the physical port.

When a frame is received at the physical port PPh1, the table processing unit 16 acquires the logical port based on the LP table 21. The FDB processing unit 18 learns a source MAC address contained in the frame in association with the logical port acquired by the table processing unit 16 to the FDB. Specifically, when a frame containing the source MAC address "MA1" and the VLAN identifier "VID1" from the terminal TM1 is received at the physical port PPh1, the table processing unit 16 acquires the port identifier {LP1} based on the logical port table 21. The FDB processing unit 18 learns the source MAC address "MA1" in association with the port identifier {LP1} to the FDB as illustrated in FIG. 13C.

Similarly, when a frame from the terminal TM2 is received at the physical port PPh1, the table processing unit 16 acquires the port identifier {LP1}. The FDB processing unit 18 learns the source MAC address "MA2" of the frame in association with the port identifier {LP1} to the FDB. Further, when a frame from the terminal TM3 is received at the physical port PPh1, the table processing unit 16 acquires the port identifier {LP2}. The FDB processing unit 18 learns the source MAC address "MA3" of the frame in association with the port identifier {LP2} to the FDB.

Further, when a frame containing the destination MAC address "MA1" is received at, for example, a physical port (not illustrated), the FDB processing unit 18 retrieves the FDB with using "MA1" as a retrieval key, and acquires the port identifier {LP1} to be a destination (referred to as a destination port identifier). When the destination port identifier is the port identifier of the logical port, the table processing unit 16 replaces the destination port identifier {LP1} with the port identifier of the physical port (here, {PPh1}) based on the logical port table 21. The frame processing unit 15 relays the received frame to the physical port PPh1 corresponding to the destination port identifier {PPh1}.

Here, for example, the FDB processing unit 18 learns the MAC address "MA1" in association with the port identifier {LP1} to the FDB in response to the frame from the terminal TM1, but may additionally learn the VLAN identifier "VID1". In this case, in the destination retrieval described above, the FDB processing unit 18 retrieves the FDB with using "MA1" and "VID1" as retrieval keys.

By using the logical port function described above, for example, the cost reduction can be achieved. Namely, by using the configuration of FIG. 13A, a plurality of physical ports and a plurality of communication lines (for example, optical fibers) which are required in the configuration of FIG. 14A can be replaced with one physical port and one communication line.

<<Configuration of Relay System>>

FIG. 1 is a schematic diagram illustrating a configuration example of main components in a relay system according to the first embodiment of the present invention. The relay system illustrated in FIG. 1 includes a plurality of relay devices connected via a communication line. In FIG. 1, relay devices SW1 to SW3 and SW'1 to SW'3 are, for example, L2 switches and others. In addition, the relay system illustrated in FIG. 1 includes a network NW in which relaying based on VLAN identifiers is performed. Here, a backbone VLAN identifier BVID based on the IEEE802.1ah (referred to also as PBB (Provider Backbone Bridge) standard) is used as the VLAN identifier. The network NW is, for example, a PBB-TE (Traffic Engineering) network or the like and is configured of relay devices and communication lines as needed.

The network NW has a configuration in which the relay devices SW1 to SW3 are connected in a full mesh. Each of the relay devices SW1 to SW3 includes the physical ports PPh1 and PPh2. The physical ports PPh1 of the relay devices SW1 to SW3 are connected to the network NW via the respective communication lines 10. Also, the physical ports PPh2 of the relay devices SW1 to SW3 are connected to the relay devices SW'1 to SW'3 via the communication lines 10, respectively.

Further, the terminals TM1 to TM3 are connected to the relay devices SW'1 to SW' 3, respectively. The terminals TM1, TM2 and TM3 have the MAC addresses "MA1", "MA2" and "MA3", respectively, and "SVID1", "SVID2" and "SVID3" based on the IEEE802.1ad are respectively allocated thereto as the VLAN identifiers VID.

Though not particularly limited, each of the relay devices SW1 to SW3 is an edge switch which can perform the frame relay between a PB (Provider Bridge) network and the PBB (Provider Backbone Bridge) network 11. The PB network is a network in which the service VLAN identifier SVID is used, and the PBB network 11 is a network in which the backbone VLAN identifier BVID (and service instance identifier ISID) based on the IEEE802.1ah is used. For example, the terminals TM1 to TM3 are terminals belonging to the same company. The relay devices SW1 to SW3 are set at respectively different locations in the same company and the communication among these locations is made through the PBB network 11 having the relay devices SW1 to SW3 as edge switches.

Here, the logical ports described with reference to FIG. 13A and others are set on the physical ports PPh1 and PPh2 of the relay devices SW1 to SW3. The logical ports LP1_1 and LP1_2 are set in association with the backbone VLAN identifiers "BVID1" and "BVID2", respectively, on the physical port PPh1 of the relay device SW1. The logical port LP2_1 is set in association with the service VLAN identifier "SVID1" on the physical port PPh2 of the relay device SW1.

Similarly, the logical ports LP1_1 and LP1_2 are set in association with "BVID1" and "BVID3", respectively, on the physical port PPh1 of the relay device SW2, and the logical port LP2_1 is set in association with "SVID2" on the physical port PPh2. Further, the logical ports LP1_1 and LP1_2 are set in association with "BVID3" and "BVID2", respectively, on the physical port PPh1 of the relay device SW3, and the logical port LP2_1 is set in association with "SVID3" on the physical port PPh2.

When a frame containing "BVID1" from the relay device SW1 is received, the network NW relays the frame to the relay device SW2, and when a frame containing "BVID2" is received, the network NW relays the frame to the relay device SW3. Also, when a frame containing "BVID1" from the relay device SW2 is received, the network NW relays the frame to the relay device SW1, and when a frame containing "BVID3" is received, the network NW relays the frame to the relay device SW3. Further, when a frame containing "BVID3" from the relay device SW3 is received, the network NW relays the frame to the relay device SW2, and when a frame containing "BVID2" is received, the network NW relays the frame to the relay device SW1.

With the VLAN configuration described above, the relay system of FIG. 1 has the configuration in which the relay devices SW1 to SW3 are connected in a full mesh, and the physical ports PPh1 (logical ports set thereon) of the relay devices SW1 to SW3 serve as the ports connected to the full-mesh network. Namely, the relay devices SW and SW2 are connected through the logical ports LP1_1 thereof and the relay devices SW1 and SW3 are connected through the logical ports LP1_2 thereof. Also, the relay devices SW2 and SW3 are connected through the logical port LP1_2 of the relay device SW2 and the logical port LP1_1 of the relay device SW3.

As described above, by using the logical ports LP1_1 and LP1_2, for example, the relay device SW1 and the network NW can be connected by one physical port PPh1 and one communication line 10 instead of a plurality of (for example, two) physical ports and a plurality of (for example, two) communication lines. The same is true for the relay devices SW2 and SW3. As a result, the full-mesh network can be constructed at low cost. Note that the full-mesh network is configured of the three relay devices SW1 to SW3 in this example, but if the network is configured of more relay devices, this effect becomes greater.

<<Configuration of Relay Device>>

Figure 2:
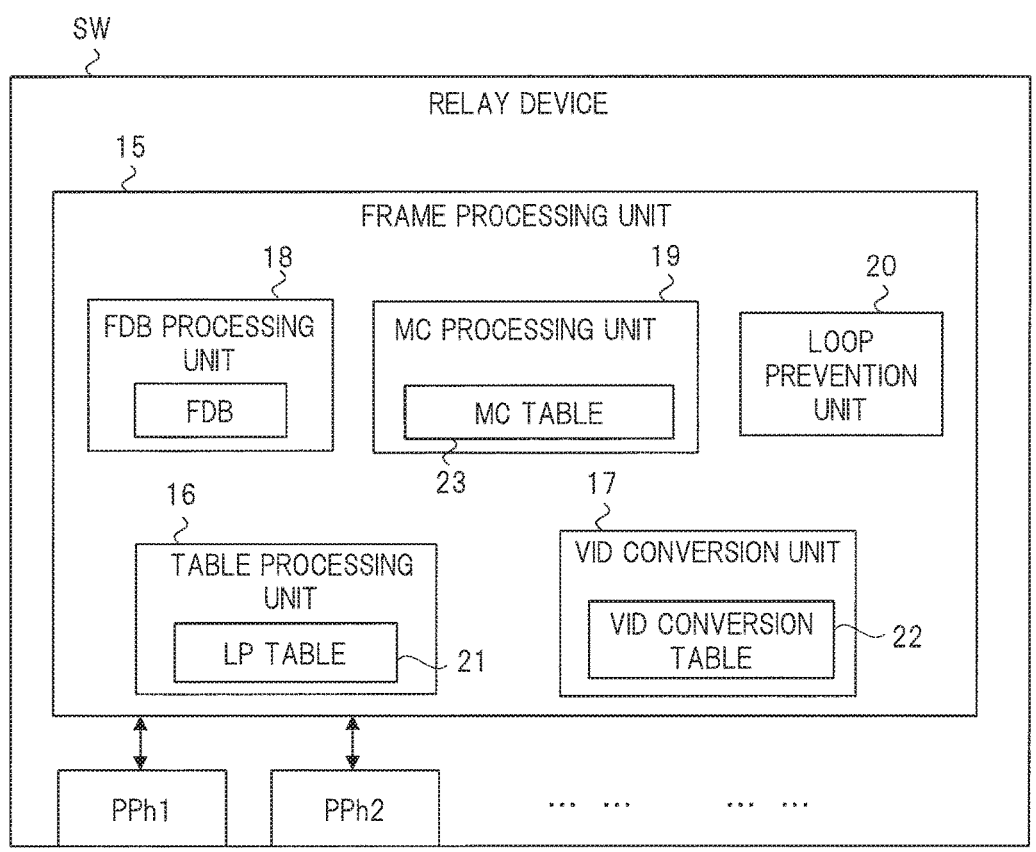
FIG. 2 is a block diagram illustrating a schematic configuration example of main components in the relay device of FIG. 1.

FIG. 2 is a block diagram illustrating a schematic configuration example of main components in the relay device of FIG. 1. FIG. 3A is a schematic diagram illustrating a configuration example of a logical port table of FIG. 2, FIG. 3B is a schematic diagram illustrating a configuration example of a VID conversion table of FIG. 2, FIG. 3C is a schematic diagram illustrating a configuration example of an FDB of FIG. 2, and FIG. 3D is a schematic diagram illustrating a configuration example of a multicast table of FIG. 2.

FIG. 2 illustrates a schematic configuration example of the relay devices SW1 to SW3 of FIG. 1. FIGS. 3A to 3D illustrate a configuration example of each table provided in the relay device SW1 of FIG. 1. The relay device SW of FIG. 2 includes two physical ports PPh1 and PPh2 and the frame processing unit 15. The frame processing unit 15 includes a VID conversion unit 17, a multicast (hereinafter, abbreviated as MC) processing unit 19 and a loop prevention unit 20 in addition to the LP table 21, the table processing unit 16, the FDB and the FDB processing unit 18 illustrated in FIG. 13A.

The LP table 21 retains the combination of the physical port and the VLAN identifier VID in association with the logical port based on the user setting or the like as illustrated in FIG. 3A. For example, the port identifier {LP1_1} is retained in association with the port identifier {PPh1} and "BVID1", and the port identifier {LP1_2} is retained in association with the port identifier {PPh1} and "BVID2". In addition, the port identifier {LP2_1} is retained in association with the port identifier {PPh2} and "SVID1". When a frame is received at a physical port, the table processing unit 16 acquires the logical port based on the LP table 21 as described above.

The VID conversion unit 17 includes a VID conversion table 22. The VID conversion table 22 retains the service VLAN identifier SVID in association with an internal VLAN identifier IVID in advance based on the user setting as illustrated in FIG. 3B. Also, the VID conversion table 22 retains the backbone VLAN identifier BVID and the service instance identifier ISID in association with an internal VLAN identifier IVID.

In the example of FIG. 3B, "SVID1" of the PB network, "BVID1" and "ISID1", and "BVID2" and "ISID1" of the PBB network 11 of FIG. 1 are respectively associated with "IVID1". Namely, in this example, the terminals TM1 to TM3 belonging to the same company are set to the same flooding domain by "IVID1", and each of the locations is distinguished by "BVID1" and "BVID2".

The VID conversion unit 17 converts a predetermined VLAN identifier (SVID, or BVID and ISID) contained in the received frame into an internal VLAN identifier IVID based on the VID conversion table 22 by the user setting. Also, the VID conversion unit 17 converts an internal VLAN identifier IVID contained in the frame to be transmitted into a predetermined VLAN identifier.

In the learning of the FDB, as described with reference to FIG. 13C, the FDB processing unit 18 learns the source MAC address contained in the received frame in association with the logical port acquired by the table processing unit 16 to the FDB. Further, in this case, the FDB processing unit 18 retains the source MAC address in association with the internal VLAN identifier IVID converted by the VID conversion unit 17 in addition to the logical port to the FDB as illustrated in FIG. 3C. Meanwhile, in the destination retrieval of FDB, the FDB processing unit 18 retrieves the FDB with using the destination MAC address and the internal VLAN identifier IVID contained in the received frame as retrieval keys, thereby acquiring the destination port identifier.

For example, when a frame from the terminal TM1 is received at the logical port LP2_1, the FDB processing unit 18 of the relay device SW1 of FIG. 1 learns "MA1" and "IVID1" in association with the port identifier {LP2_1} to the FDB. Also, when a frame from the terminal TM2 is received at the logical port LP1_1, the FDB processing unit 18 learns "MA2" and "IVID1" in association with the port identifier {LP1_1} to the FDB. Further, when a frame from the terminal TM3 is received at the logical port LP1_2, the FDB processing unit 18 learns "MA3" and "IVID1" in association with the port identifier {LP1_2} to the FDB.

The MC processing unit 19 includes an MC table 23. The MC table 23 retains a correspondence relation between the internal VLAN identifier IVID and one or a plurality of logical ports in advance based on the user setting as illustrated in FIG. 3D. In the example of FIG. 3D, the correspondence relation between "IVID1" and the port identifiers {LP1_1}, {LP1_2} and {LP2_1} is retained. When the received frame is a multicast frame or when the result of the destination retrieval of the FDB is mishit, the MC processing unit 19 determines one or a plurality of logical ports to be a destination with reference to the MC table 23 by the use of the internal VLAN identifier IVID of the frame.

The loop prevention unit 20 prohibits the frame relay between a plurality of logical ports (for example, LP1_1 and LP1_2) set on the physical port (for example, PPh1) based on the user setting or the like. At this time, the user can determine whether to prohibit the relay between the logical ports (that is, whether to enable the loop prevention unit 20) for each of the physical ports (for example, PPh1 and PPh2) on which the logical port is to be set.

Figure 4:
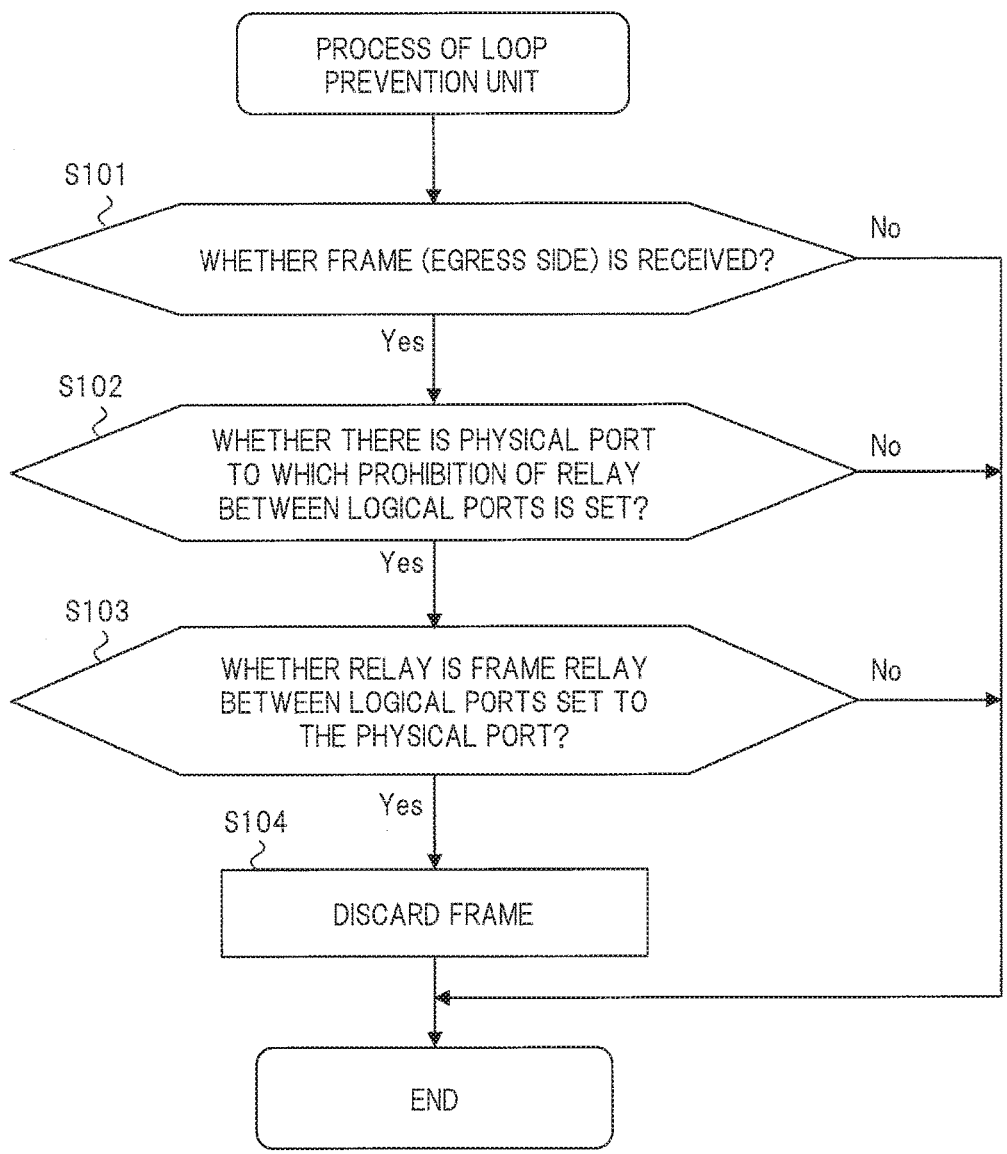
FIG. 4 is a flowchart illustrating an example of process contents of a loop prevention unit of FIG. 2.

FIG. 4 is a flowchart illustrating an example of process contents of the loop prevention unit of FIG. 2. In FIG. 4, when a frame to be transmitted (that is, egress frame) is received (step S101), the loop prevention unit 20 determines whether there is a physical port to which the prohibition of the relay between logical ports is set by the user (step S102). When there is the physical port, the loop prevention unit 20 determines whether the relay of the received frame is the frame relay between the logical ports set on the physical port (step S103).

For example, when the prohibition of the relay between the logical ports is set to the physical port PPh1, the loop prevention unit 20 extracts the frame which has been received at a logical port LP1_$x$ ($x$ is an arbitrary integer) and whose destination port is the logical port LP1_$y$ ($y$ is an arbitrary integer other than $x$). Then, the loop prevention unit 20 discards the extracted frame (step S104). Note that the frame which has been received at the logical port LP1_$x$ and whose destination port is the logical port LP1_$x$ is discarded by the return prohibiting function generally provided in the relay device. The loop prevention unit 20 does nothing when the respective conditions of the steps S101 to S103 are not satisfied, and ends the process.

<<Operation of Relay System>>

Figure 5:
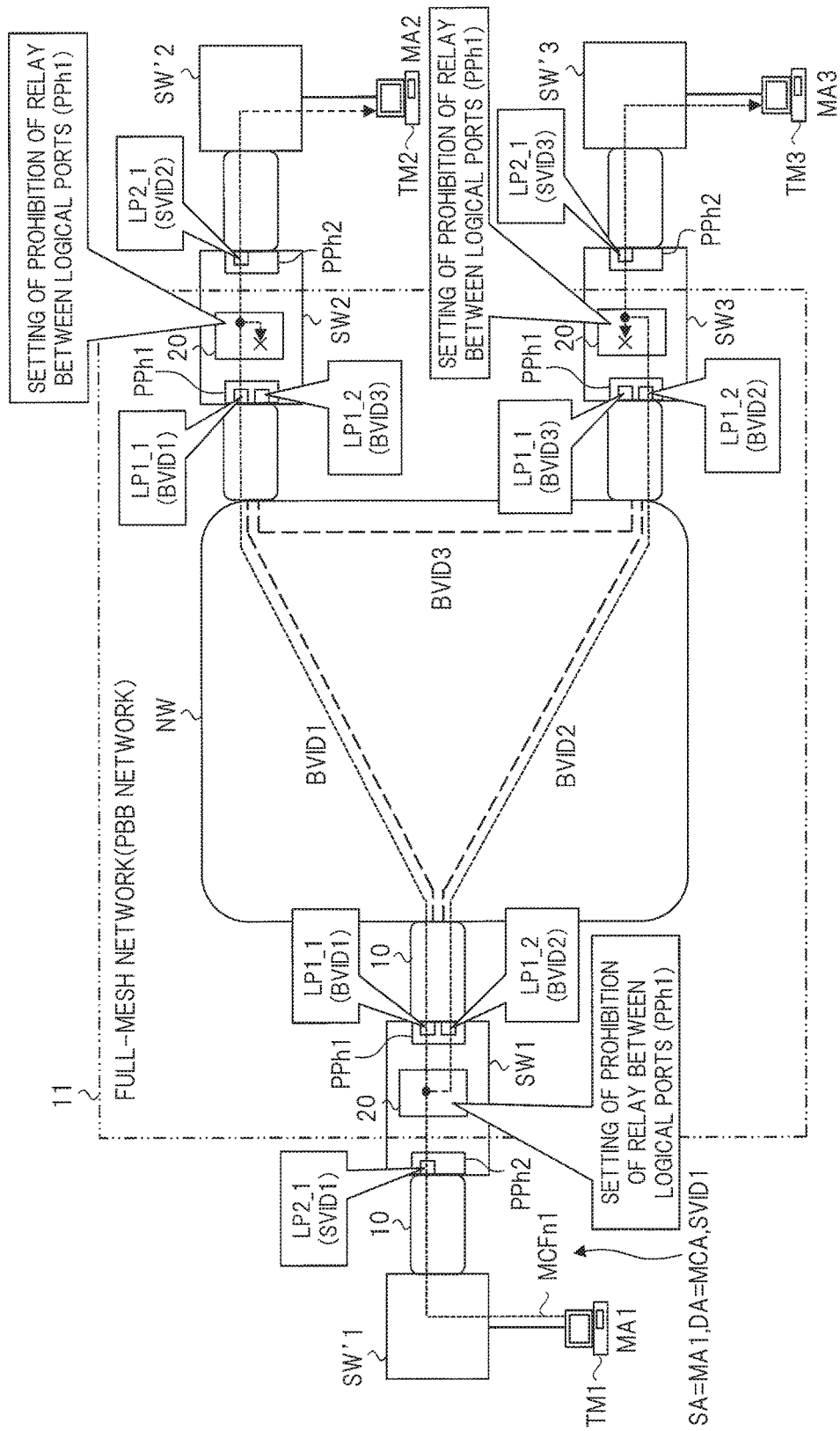
FIG. 5 is an explanatory diagram illustrating a schematic operation example of the relay system of FIG. 1.
Figure 6:
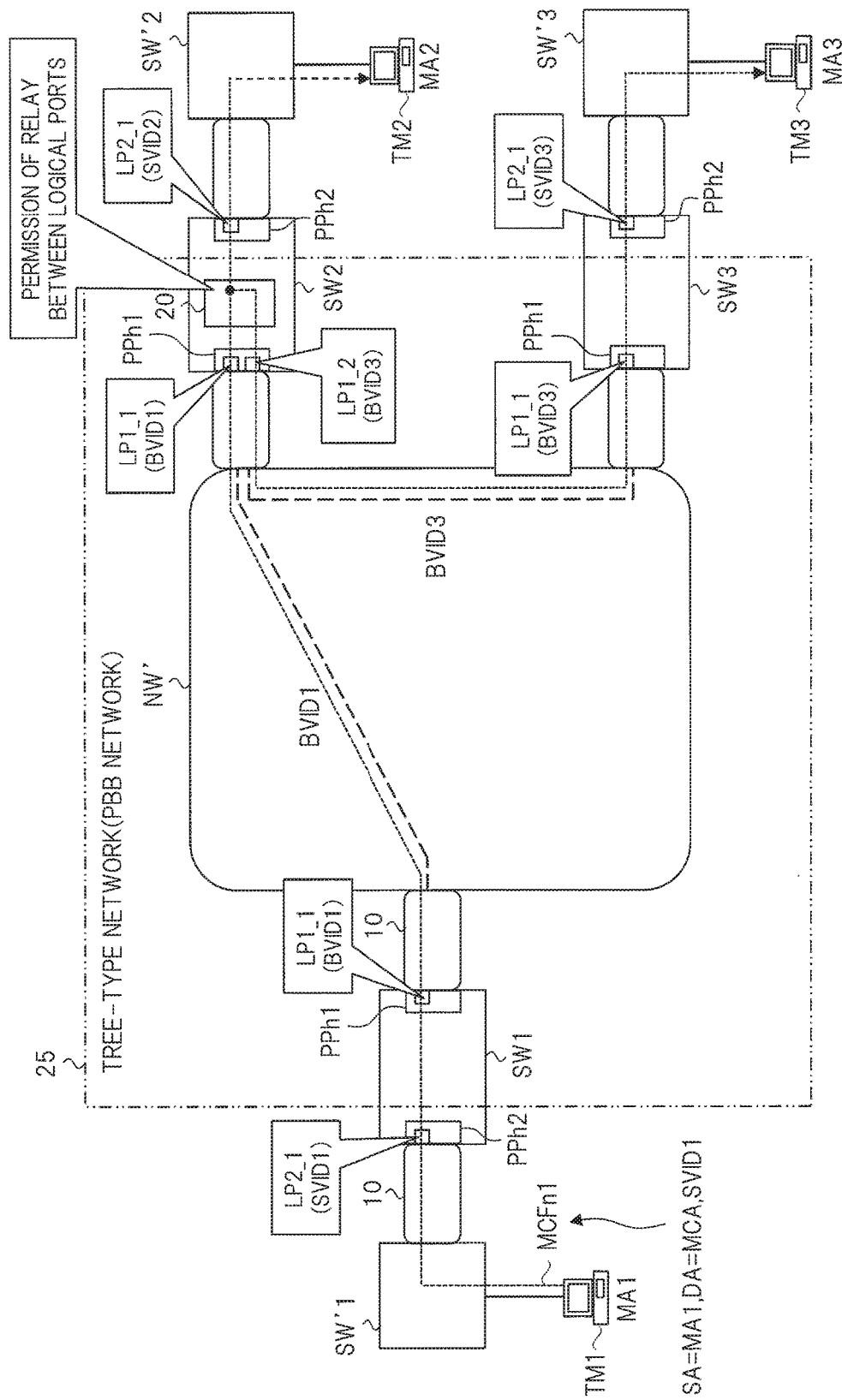
FIG. 6 is an explanatory diagram illustrating an operation example to be a comparative example of FIG. 5.
Figure 7:
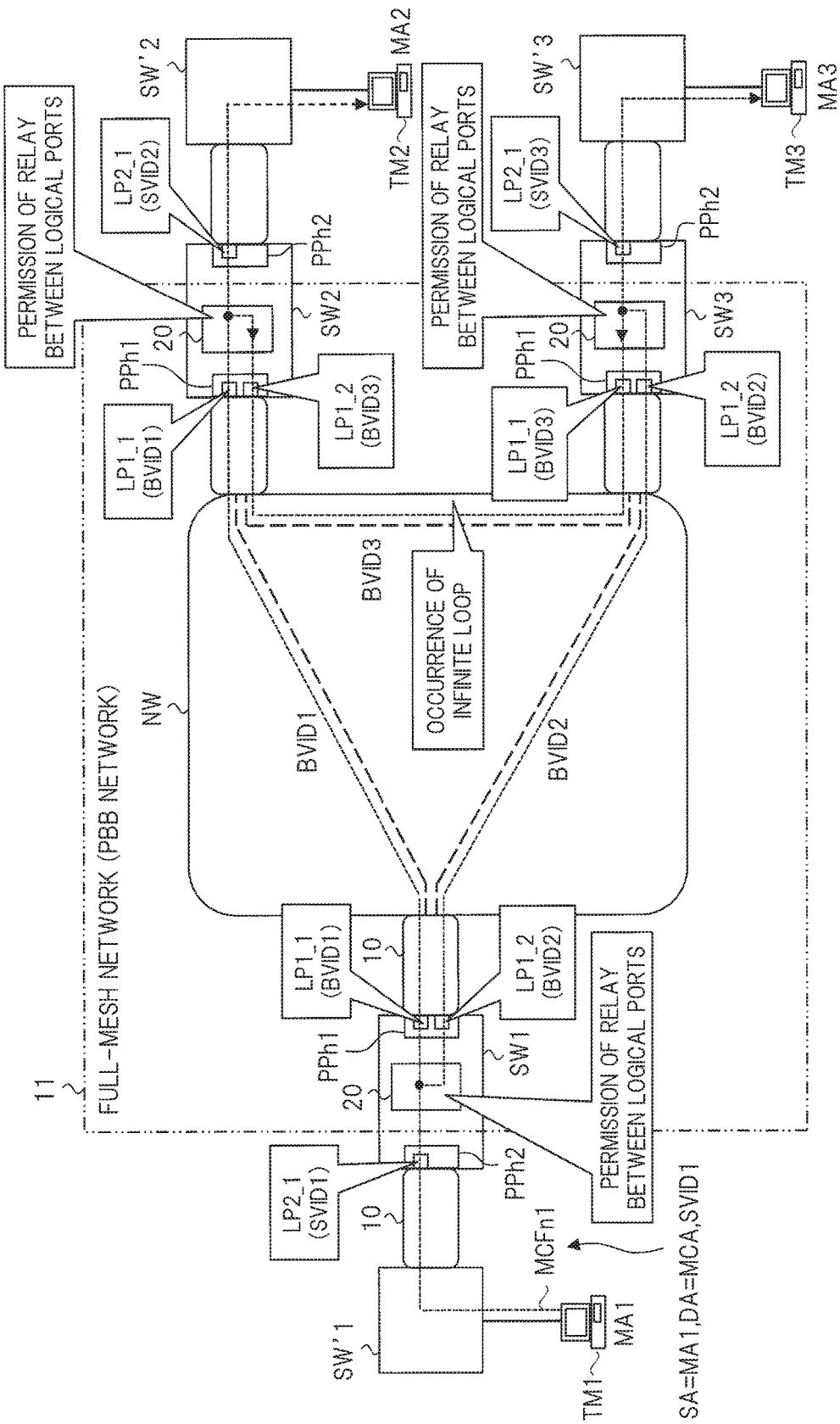
FIG. 7 is an explanatory diagram illustrating another operation example to be a comparative example of FIG. 5.

FIG. 5 is an explanatory diagram illustrating a schematic operation example of the relay system of FIG. 1. FIG. 6 and FIG. 7 are explanatory diagrams each illustrating an operation example to be a comparative example of FIG. 5. The case where the terminal TM1 transmits a multicast frame MCFn1 to all the terminals in the company including the terminals TM2 and TM3 is assumed here.

First, FIG. 6 illustrates an operation example in the case where a direct communication path between the relay device SW1 and the relay device SW3 is not provided in the network NW' unlike the relay system of FIG. 1. Accordingly, the relay devices SW1 to SW3 constitute a tree-type network 25. Also, FIG. 6 assumes the case where each of the relay devices SW1 to SW3 is not provided with the loop prevention unit 20 illustrated in FIG. 2 or the case where the loop prevention unit 20 is provided but the prohibition of the relay between logical ports is not set.

In FIG. 6, the relay device SW1 receives the multicast frame MCFn1 from the terminal TM1 at the physical port PPh2. The multicast frame MCFn1 contains "MA1" serving as a source MAC address (SA), a predetermined multicast address (hereinafter, referred to as MCA) serving as a destination MAC address (DA), and "SVID1". The relay device SW1 receives the frame at the logical port LP2_1 with reference to the LP table 21 of FIG. 3A by the use of the combination of the physical port PPh2 and "SVID1".

Also, since the destination MAC address is MCA, the relay device SW1 performs the relay based on the MC table 23. In the case of the configuration of FIG. 6, the MC table 23 retains the correspondence relation between "IVID1" and the port identifiers {LP1_1} and {LP2_1} unlike the case of FIG. 3D. Based on this, the relay device SW1 relays the multicast frame MCFn1 to the logical port LP1_1 except the logical port LP2_1 which has received the frame. At this time, the relay device SW1 adds "BVID1" as the VLAN identifier to the frame based on the LP table 21.

The network NW' relays the multicast frame MCFn1 to the relay device SW2 based on "BVID1", and the relay device SW2 receives the frame at the physical port PPh1. The relay device SW2 receives the frame at the logical port LP1_1 with reference to its own LP table 21 by the use of the combination of the physical port PPh1 and "BVID1".

Also, since the destination MAC address is MCA, the relay device SW2 performs the relay based on its own MC table 23. The MC table 23 retains the information similar to that of FIG. 3D, and the relay device SW2 relays the multicast frame MCFn1 to the logical ports LP1_2 and LP2_1 except the logical port LP1_1 which has received the frame based on the information. At this time, the relay device SW2 adds "SVID2" to the frame to be relayed to the logical port LP2_1 and adds "SVID3" to the frame to be relayed to the logical port LP1_2 based on its own LP table 21.

The frame relayed to the logical port LP2_1 is received by the terminal TM2. Meanwhile, the frame relayed to the logical port LP1_2 is relayed to the relay device SW3 through the network NW'. The relay device SW3 receives the frame at the physical port PPh1. The relay device SW3 receives the frame at the logical port LP1_1 with reference to its own LP table 21 by the use of the combination of the physical port PPh1 and "BVID3".

Also, since the destination MAC address is MCA, the relay device SW3 performs the relay based on its own MC table 23. The MC table 23 retains the correspondence relation between "IVID1" and the port identifiers {LP1_1} and {LP2_1} like the case of the relay device SW1. The relay device SW3 relays the multicast frame MCFn1 to the logical port LP2_1 except the logical port LP1_1 which has received the frame based on this. At this time, the relay device SW3 adds "SVID3" to the frame to be relayed to the logical port LP2_1 based on its own LP table 21. The frame relayed to the logical port LP2_1 is received by the terminal TM3.

As described above, in the case of the tree-type network 25, the relay devices SW1 to SW3 can distribute the multicast frame MCFn1 to each location when the loop prevention unit 20 is not provided or when the loop prevention unit 20 is provided and the prohibition of the relay between logical ports is not set. However, when the full-mesh network 11 is used as illustrated in FIG. 7, the infinite loop may occur unless the prohibition of relay between logical ports is set.

FIG. 7 illustrates an operation example in the case where the relay devices SW1 to SW3 permit the relay between logical ports in the full-mesh network 11 similar to that of FIG. 1. In FIG. 7, unlike the case of FIG. 6, for example, the physical port PPh1 of the relay device (first relay device) SW1 is connected at least to the relay device (second relay device) SW2 and the relay device (third relay device) SW3. Further, the relay device SW2 is connected to the relay device SW3 without interposing the relay device SW1.

In the following description, the difference from FIG. 6 will be mainly described. In the case of FIG. 7, the relay device SW1 relays the multicast frame MCFn1 received at the logical port LP2_1 to the logical port LP1_2 in addition to the logical port LP1_1 based on the MC table 23 of FIG. 3D. Based on the LP table 21 of FIG. 3A, "BVID2" is added to the frame relayed to the logical port LP1_2.

The network NW relays the multicast frame MCFn1 to the relay device SW3 based on "BVID2", and the relay device SW3 receives the frame at the physical port PPh1. The relay device SW3 receives the frame at the logical port LP1_2 with reference to its own LP table 21 by the use of the combination of the physical port PPh1 and "BVID2".

Also, since the destination MAC address is MCA, the relay device SW3 performs the relay based on its own MC table 23. The MC table 23 retains information similar to that of FIG. 3D, and the relay device SW3 relays the multicast frame MCFn1 to the logical ports LP1_1 and LP2_1 except the logical port LP1_2 which has received the frame based on the information. At this time, the relay device SW3 adds "SVID3" to the frame to be relayed to the logical port LP2_1 and adds "BVID3" to the frame to be relayed to the logical port LP1_1 based on its own LP table 21.

The frame relayed to the logical port LP2_1 is received by the terminal TM3. Meanwhile, the frame relayed to the logical port LP1_1 is relayed to the relay device SW2 through the network NW. The relay device SW2 receives the frame at the physical port PPh1. The relay device SW2 receives the frame at the logical port LP1_2 with reference to its own LP table 21 by the use of the combination of the physical port PPh1 and "BVID3".

Here, since the destination MAC address is MCA, the relay device SW2 relays the multicast frame MCFn1 to the logical ports LP1_1 and LP2_1 based on its own MC table 23. The frame relayed to the logical port LP1_1 is received at the logical port LP1_1 of the relay device SW1, and is then relayed by the relay device SW1 to the logical port LP1_2 again in addition to the logical port LP2_1.

Also, as described with reference to FIG. 6, the relay device SW3 has received the multicast frame MCFn1 from the relay device SW2 at the logical port LP1_1, and relays the frame to the logical ports LP1_2 and LP2_1 in the configuration of FIG. 7. The frame relayed to the logical port LP1_2 is received at the logical port LP1_2 of the relay device SW1, and is then relayed by the relay device SW1 to the logical port LP1_1 again in addition to the logical port LP2_1. Due to the operation described above, the infinite loop may occur.

Thus, in FIG. 5, each of the relay devices SW1 to SW3 includes the loop prevention unit 20 illustrated in FIG. 2, and the loop prevention unit 20 prohibits the relay between logical ports for the physical port PPh1. In this case, like the case of FIG. 6, the relay device SW2 receives the multicast frame MCFn1 transmitted from the logical port LP1_1 of the relay device SW1 at the logical port LP1_1. The relay device SW2 determines the logical ports LP1_2 and LP2_1 as the destination ports based on its own MC table 23. Since the frame relayed to the logical port LP1_2 corresponds to the relay between logical ports set on the physical port PPh1, the loop prevention unit 20 of the relay device SW2 discards the frame.

Similarly, the relay device SW3 receives the multicast frame MCFn1 transmitted from the logical port LP1_2 of the relay device SW1 at the logical port LP1_2. The relay device SW3 determines the logical ports LP1_1 and LP2_1 as the destination ports based on its own MC table 23. Since the frame relayed to the logical port LP1_1 corresponds to the relay between logical ports set on the physical port PPh1, the loop prevention unit 20 of the relay device SW3 discards the frame.

In this manner, it is possible to construct the full-mesh network 11 capable of distributing the multicast frame to the terminals TM1 to TM3 while preventing the loop of the frame. Also when the one relay device (for example, SW2) prohibits the relay between logical ports in FIG. 5, the prevention of the loop is possible. In this case, however, the relay device SW2 duplicately receives the frame from the relay device SW1 and the frame from the relay device SW3. Therefore, it is desirable that the loop prevention units 20 of all the relay devices SW1 to SW3 prohibit the relay between logical ports for the physical ports PPh1 as illustrated in FIG. 5.

Namely, since one hop relay is possible between the relay devices SW1 to SW3 in the full-mesh network 11, the loop of the frame and the duplicate transmission can be prevented by prohibiting the relay between logical ports corresponding to two or more hop relay. Note that the case where the full-mesh network 11 is constructed of the three relay devices SW1 to SW3 has been taken as an example here, but the same is true for the case where it is constructed of four or more relay devices. Further, with respect to the physical ports PPh2 of the relay devices SW1 to SW3 in FIG. 5, whether the relay between logical ports is prohibited may be appropriately determined in accordance with the network configuration connected to the physical ports PPh2 or the like.

As described above, by using the relay device and the relay system according to the first embodiment, typically, the full-mesh network can be constructed at low cost.

Second Embodiment

<<Detailed Configuration of Relay Device>>

Figure 8:
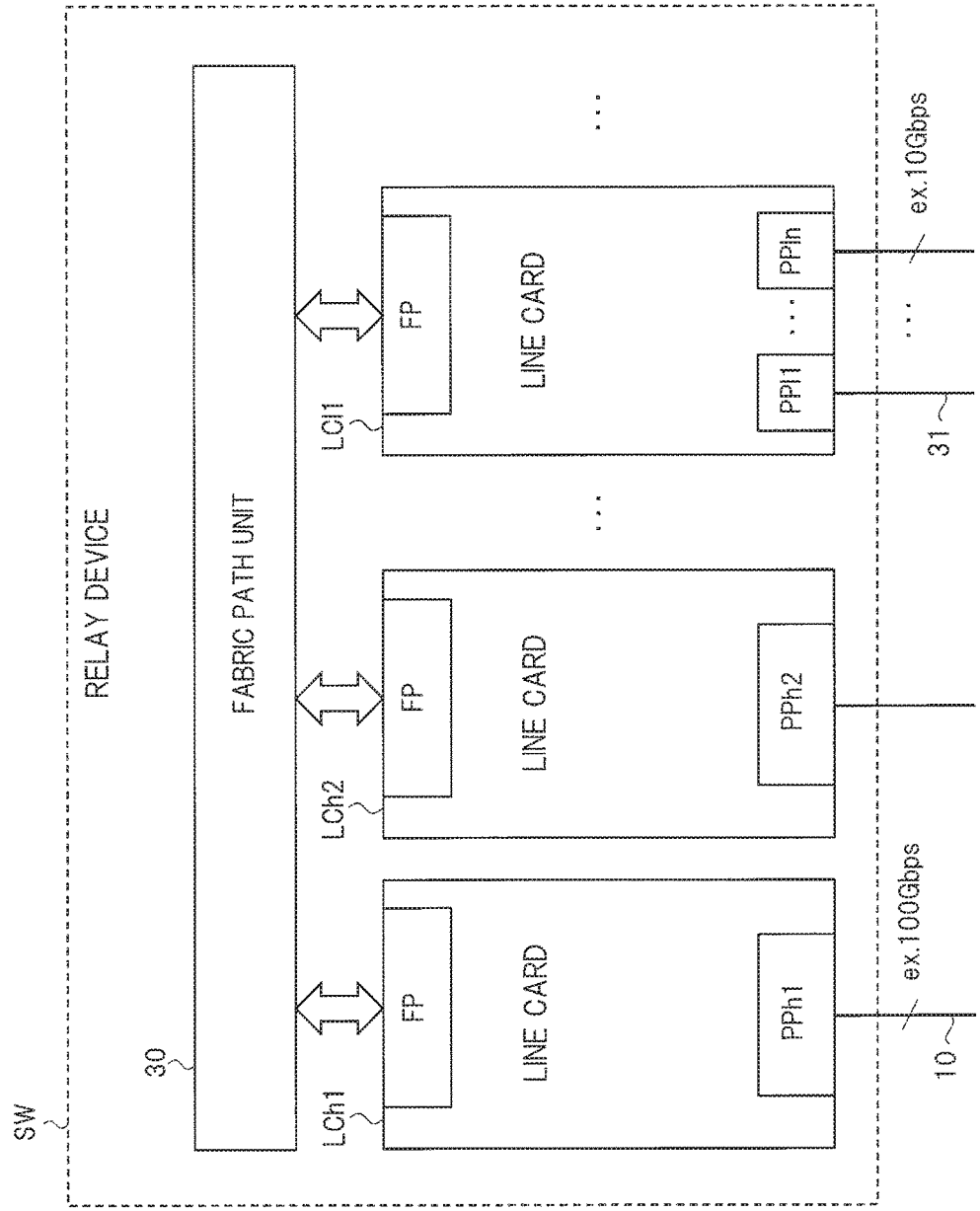
FIG. 8 is a block diagram illustrating a configuration example of main components in a relay device according to the second embodiment of the present invention.

FIG. 8 is a block diagram illustrating a configuration example of main components in a relay device according to the second embodiment of the present invention. The relay device SW illustrated in FIG. 8 is a chassis-type L2 switch in which a plurality of cards are mounted in one chassis. The relay device SW includes one or a plurality of (here, two) high-bandwidth line cards LCh1 and LCh2, one or a plurality of (here, one) low-bandwidth line card LC11, and a fabric path unit 30. Each of the line cards LCh1, LCh2 and LC11 communicates (transmits and receives) a frame with an external device. The fabric path unit 30 relays a frame between the line cards.

Each of the high-bandwidth line cards LCh1 and LCh2 includes a physical port PPh1 or PPh2 and a fabric terminal FP. The physical ports PPh1 and PPh2 are the ports for which the logical ports described in the first embodiment and others are to be set. The physical ports PPh1 and PPh2 are connected to, for example, the communication line 10 of 100 Gbps or the like. Meanwhile, the low-bandwidth line card LC11 includes n physical ports PP11 to PP1n and a fabric terminal FP. The physical ports PP11 to PP1n are the ports for which the logical port is not to be set. Each of the physical ports PP11 to PP1n is connected to, for example, a communication line 31 of 10 Gbps or the like.

The fabric terminal FP is connected to the fabric path unit 30 and is then connected to the fabric terminal FP of another line card via the fabric path unit 30. The fabric path unit 30 may be configured of, for example, a fabric card having a switching function or may be configured of a wiring board (backplane) having a full-mesh wiring. In the former case, the fabric terminal FP is connected to the fabric card and is then connected to the fabric terminals FP of other line cards via the switching of the fabric card. In the latter case, the fabric terminal FP is configured of a plurality of terminals, and the plurality of terminals are connected to the corresponding terminals of other line cards via the full-mesh wiring provided on the backplane. In the following description, the latter case is assumed.

Figure 9:
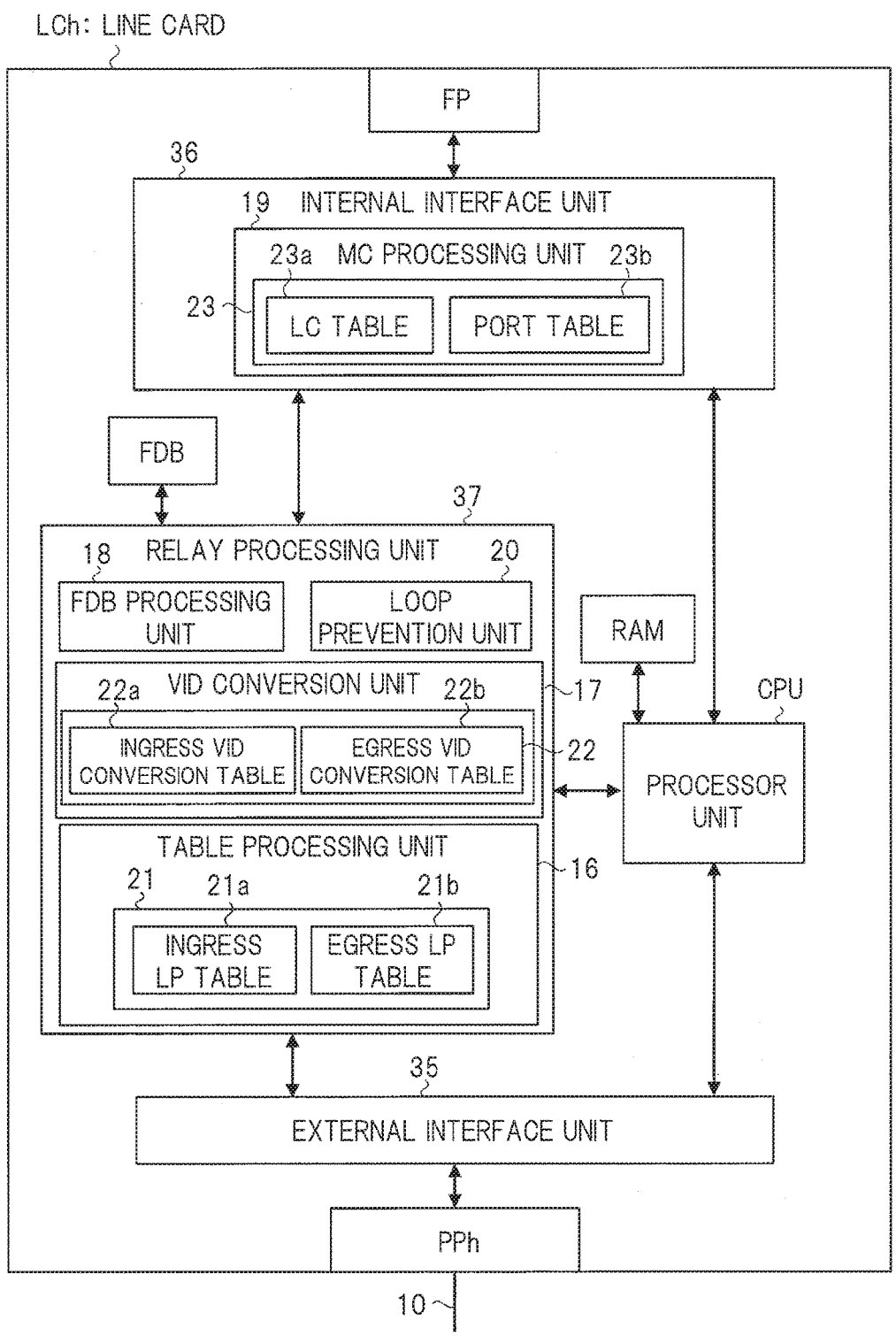
FIG. 9 is a block diagram illustrating a configuration example of a high-bandwidth line card in the relay device of FIG. 8.

FIG. 9 is a block diagram illustrating a configuration example of the high-bandwidth line card in the relay device of FIG. 8. FIG. 10A is a schematic diagram illustrating a configuration example of an LC table of FIG. 9, FIG. 10B is a schematic diagram illustrating a configuration example of a port table of FIG. 9, and FIG. 10C is a schematic diagram illustrating a configuration example of an FDB of FIG. 9. In FIG. 9, when a frame is received at the physical port PPh, an external interface unit 35 adds a reception port identifier indicating the line card and the physical port, which have received the frame, to the frame, and transmits it to a relay processing unit 37 or a processor unit CPU. Also, the external interface unit 35 transmits the frame from the relay processing unit 37 or the processor unit CPU to the physical port PPh based on the destination port identifier.

The relay processing unit 37 includes the table processing unit 16, the VID conversion unit 17, the FDB processing unit 18 and the loop prevention unit 20. The table processing unit 16 includes the ingress LP table 21a and the egress LP table 21b as the LP table 21. Each of the ingress/egress LP tables 21a and 21b has the configuration illustrated in FIG. 3A.

When a frame is received at the physical port PPh of its own line card, the table processing unit 16 acquires the port identifier of the logical port from the reception port identifier {PPh} and the VLAN identifier based on the ingress LP table 21a. Meanwhile, when a frame is transmitted from the physical port, the table processing unit 16 acquires the port identifier and the VLAN identifier of the physical port from the destination port identifier (to be the port identifier of the logical port) based on the egress LP table 21b. The table processing unit 16 adds the identifiers acquired in this manner to the frame.

The VID conversion unit 17 includes an ingress VID conversion table 22a and an egress VID conversion table 22b as the VID conversion table 22. Each of the ingress/egress VID conversion tables 22a and 22b has the configuration illustrated in FIG. 3B. When the physical port PPh of its own line card is connected to the PB network and a frame is received at the physical port, the VID conversion unit 17 converts the service VLAN identifier SVID into the internal VLAN identifier IVID based on the ingress VID conversion table 22a. Meanwhile, when a frame is transmitted from the physical port, the VID conversion unit 17 converts the internal VLAN identifier IVID into the service VLAN identifier SVID based on the egress VID conversion table 22b.

Also, when the physical port PPh of its own line card is connected to the PBB network and a frame is received at the physical port, the VID conversion unit 17 converts the backbone VLAN identifier BVID and the service instance identifier ISID into the internal VLAN identifier IVID based on the ingress VID conversion table 22a. Meanwhile, when a frame is transmitted from the physical port, the VID conversion unit 17 converts the internal VLAN identifier IVID into the backbone VLAN identifier BVID and the service instance identifier ISID based on the egress VID conversion table 22b. The VID conversion unit 17 adds the identifiers converted in this manner to the frame.

When a frame is received at the physical port PPh of its own line card, the FDB processing unit 18 performs the learning of the FDB and the retrieval of the destination of the frame based on the FDB. Specifically, in the learning of the FDB, the FDB processing unit 18 learns a source MAC address contained in the received frame and the internal VLAN identifier IVID converted by the VID conversion unit 17 in association with the port identifier of the logical port acquired by the table processing unit 16 to the FDB as illustrated in FIG. 10C.

At this time, in detail, when the received frame is an encapsulated frame based on the IEEE802.1ah (that is, when the physical port PPh of its own line card is connected to the PBB network), the FDB processing unit 18 learns the source customer MAC address CMAC and the source encapsulation MAC address BMAC as the source MAC addresses. On the other hand, when the received frame is a non-encapsulated frame based on the IEEE802.1ad (that is, when the physical port PPh of its own line card is connected to the PB network), the FDB processing unit 18 learns the source customer MAC address CMAC as the source MAC address.

Also, at the time of the retrieval of the destination based on the FDB, the FDB processing unit 18 retrieves the FDB with using the destination MAC address contained in the received frame and the internal VLAN identifier IVID converted by the VID conversion unit 17 as retrieval keys. At this time, in detail, when the received frame is an encapsulated frame and the destination encapsulation MAC address BMAC is destined for its own device, the FDB processing unit 18 retrieves the FDB with using the destination customer MAC address CMAC and the internal VLAN identifier IVID as retrieval keys, thereby acquiring the destination port identifier.

Further, when the received frame is an encapsulated frame and the destination encapsulation MAC address BMAC is destined for another device, the FDB processing unit 18 retrieves the FDB with using the destination encapsulation MAC address BMAC and the internal VLAN identifier IVID as retrieval keys, thereby acquiring the destination port identifier. Meanwhile, when the received frame is a non-encapsulated frame, the FDB processing unit 18 retrieves the FDB with using the destination customer MAC address CMAC and the internal VLAN identifier IVID as retrieval keys, thereby acquiring the destination port identifier or the destination encapsulation MAC address BMAC in addition to the destination port identifier.

The FDB processing unit 18 adds the destination port identifier (or the destination encapsulation MAC address BMAC in addition to the destination port identifier) acquired by the retrieval result like this to the received frame and transmits the frame to the internal interface unit 36. At this time, when the retrieval result is mishit (including the case where the destination MAC address is MCA), the FDB processing unit 18 adds an MC flag to the received frame. When a frame is received from the internal interface unit 36, the loop prevention unit 20 determines whether the relay of the received frame is the frame relay between the plurality of logical ports set for the physical port PPh of its own line card, and prohibits the relay of the frame when corresponding to it.

The internal interface unit 36 includes the MC processing unit 19 and an LC table 23a and a port table 23b as the MC table 23. When a frame to which the MC flag is not added is received from the relay processing unit 37, the internal interface unit 36 directly transmits the frame to the fabric terminal FP. Meanwhile, when a frame to which the MC flag is added is received from the relay processing unit 37, the internal interface unit 36 performs the multicast relay by the use of the MC processing unit 19.

As illustrated in FIG. 10A, the LC table 23a retains the correspondence relation between the internal VLAN identifier IVID and one or a plurality of line card identifiers. As illustrated in FIG. 10B, the port table 23b retains the correspondence relation between the internal VLAN identifier IVID and one or a plurality of logical port identifiers/physical port identifiers. The one or plurality of logical port identifiers/physical port identifiers are determined within a range of the ports provided in its own line card. For example, since the line card LCh illustrated in FIG. 9 is provided with only one physical port PPh for which the logical port is set, only one or a plurality of logical port identifiers are retained in FIG. 10B.

When a frame to which the MC flag is added is received, the MC processing unit 19 determines one or a plurality of destination line cards based on the LC table 23a, replicates the frames by the number of destinations, adds the destination line card identifiers to the respective replicated frames, and then transmits the frames to the fabric terminal FP. At this time, when the frame whose destination line card is its own line card is generated, the MC processing unit 19 performs the process based on the port table 23b.

Also, when the frame to which the MC flag is added is received at the fabric terminal FP or when the frame whose destination line card is its own line card is generated as described above, the MC processing unit 19 determines one or a plurality of destination ports based on the port table 23b. Then, the MC processing unit 19 replicates frames by the number of destinations, adds the destination port identifiers to the respective replicated frames, and then transmits the frames to the relay processing unit 37.

The processor CPU executes the program stored in the RAM, thereby performing, for example, the management of its own line card and the complicated protocol processes in cooperation with the relay processing unit 37. Note that the external interface unit 35 and the internal interface unit 36 are mounted in, for example, ASIC (Application Specific Integrated Circuit) or the like. In addition, the relay processing unit 37 is mounted in, for example, FPGA (Field Programmable Gate Array) including an integrated RAM or the like, and the FDB is mounted in, for example, CAM (Content Addressable Memory) or the like. A specific mounting form of each unit is not limited thereto, and each unit may be mounted by hardware, software, or the combination thereof as needed.

<<Frame Relay Operation in Relay Device>>

Figure 11:
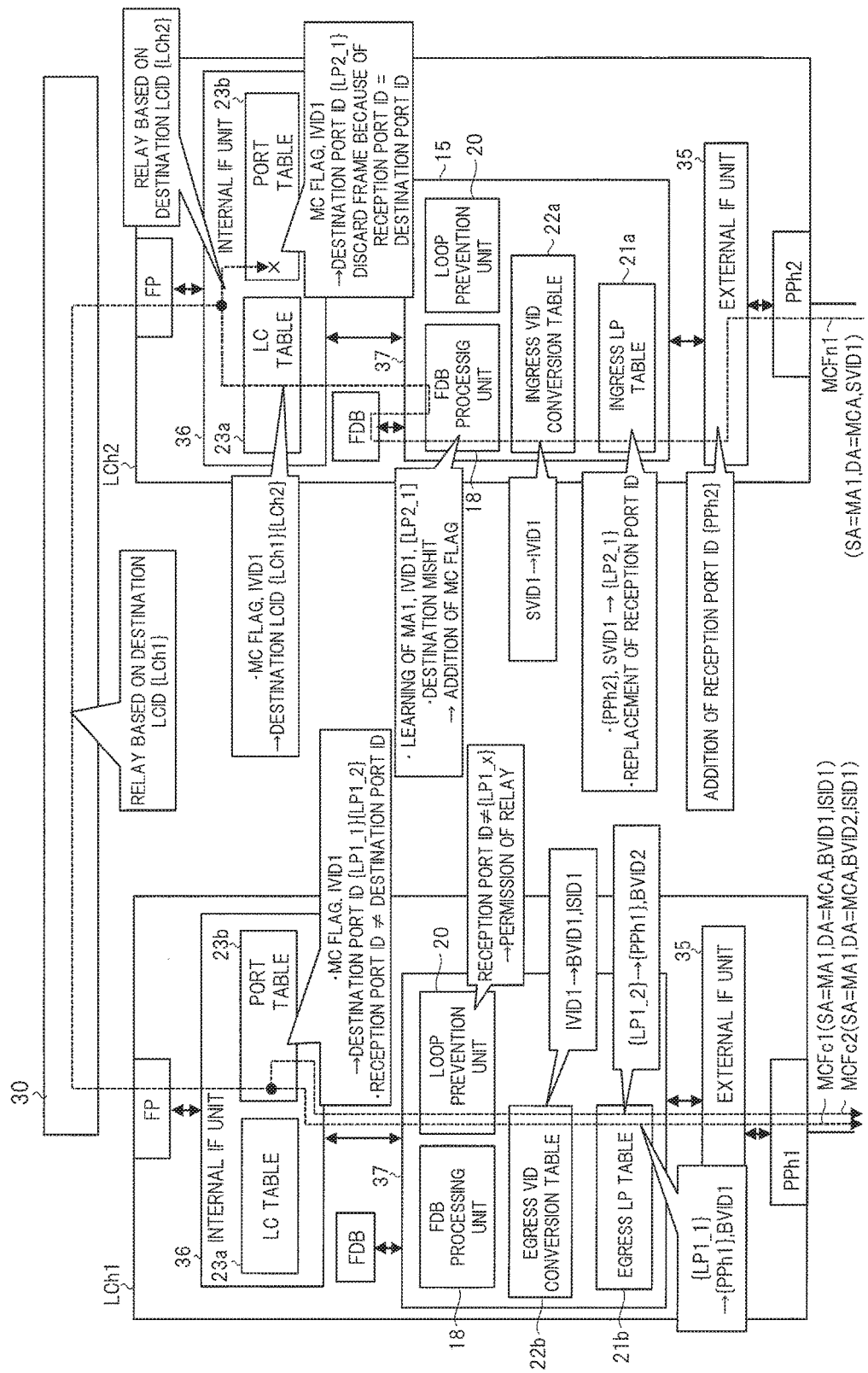
FIG. 11 is an explanatory diagram illustrating a schematic operation example in the case where the relay device of FIG. 8 is applied to the relay system of FIG. 5.

FIG. 11 is an explanatory diagram illustrating a schematic operation example in the case where the relay device of FIG. 8 is applied to the relay system of FIG. 5. FIG. 11 illustrates the operation example of the relay device SW1 in FIG. 5. In FIG. 11, first, the line card LCh2 receives the frame (non-encapsulated frame) MCFn1 from the terminal TM1 at the physical port PPh2. The frame MCFn1 contains the source MAC address (SA) "MA1", the destination MAC address (DA) "MCA" and the service VLAN identifier "SVID1". In detail, the source MAC address and the destination MAC address are the source customer MAC address (CSA) and the destination customer MAC address (CDA).

The external interface unit 35 adds the reception port identifier {PPh2} to the received frame and then transmits it to the relay processing unit 37. In the relay processing unit 37, the table processing unit 16 acquires the port identifier {LP2_1} of the logical port LP2_1 from the reception port identifier {PPh2} and the service VLAN identifier "SVID1" based on the ingress LP table 21a, and replaces the reception port identifier with the port identifier {LP2_1}. The VID conversion unit 17 converts the service VLAN identifier "SVID1" into the internal VLAN identifier "IVID1" based on the ingress VID conversion table 22a, and adds the internal VLAN identifier "IVID1" to the frame.

The FDB processing unit 18 learns the source MAC address "MA1" and the internal VLAN identifier "IVID1" of the frame in association with the reception port identifier {LP2_1} to the FDB. Also, since the destination MAC address of the frame is "MCA", the FDB processing unit 18 adds the MC flag to the frame and transmits the frame to the internal interface unit 36. Since the frame to which the MC flag is added is received, the MC processing unit 19 in the internal interface unit 36 acquires the destination line card identifiers {LCh1} and {LCh2} corresponding to "IVID1" based on the LC table 23a. The MC processing unit 19 adds the destination line card identifiers {LCh1} and {LCh2} to the respective two replicated frames.

The MC processing unit 19 transmits the frame to which the destination line card identifier {LCh1} is added to the fabric path unit 30. Meanwhile, since the frame to which the destination line card identifier {LCh2} is added is destined for its own line card, the MC processing unit 19 processes the frame by the use of the port table 23b. Specifically, the MC processing unit 19 acquires the destination port identifier {LP2_} corresponding to "IVID1" based on the port table 23b. Here, since the reception port identifier and the destination port identifier are both {LP2_1}, the MC processing unit 19 discards the frame.

The fabric path unit 30 (full-mesh wiring) relays the frame to which the line card identifier {LCh1} is added to the line card LCh1. The frame relayed to the line card LCh1 is received by the internal interface unit 36 of the line card LCh1. Since the frame to which the MC flag is added is received at the fabric terminal FP, the MC processing unit 19 of the internal interface unit 36 acquires the destination port identifiers {LP1_1} and {LP1_2} corresponding to "IVID1" based on the port table 23b. Since the destination port identifiers are both different from the reception port identifier, the MC processing unit 19 replicates two frames, adds the destination port identifiers {LP1_1} and {LP1_2} to the respective two frames, and transmits the frames to the relay processing unit 37.

Since the received two frames do not correspond to the relay between logical ports set for the physical port PPh1 of its own line card, the loop prevention unit 20 of the relay processing unit 37 permits the relay of the two frames. Specifically, the loop prevention unit 20 determines that the frame does not correspond to the relay between logical ports from the fact that the reception port identifier is not {LP1_$x$} ($x$ is an arbitrary integer).

The VID conversion unit 17 converts the internal VLAN identifiers "IVID1" contained in the two frames into the backbone VLAN identifier "BVID1" and the service instance identifier "ISID1" based on the egress VID conversion table 22b. In more detail, the relay processing unit 37 includes an encapsulation executing unit. The encapsulation executing unit encapsulates the two frames with the backbone VLAN identifier "BVID1", the service instance identifier "ISID1" and the source/destination encapsulation MAC address BMAC, thereby generating the encapsulated frames. The source encapsulation MAC address (BSA) is a MAC address of the relay device SW1, and the destination encapsulation MAC address (BDA) is "MCA".

The table processing unit 16 receives the frame to which the destination port identifier {LP1_1} is added, and acquires the port identifier {PPh1} and the backbone VLAN identifier "BVID1" of the physical port PPh1 from the destination port identifier {LP1_1} based on the egress LP table 21b. The table processing unit 16 replaces the destination port identifier with the port identifier {PPh1} and further replaces the backbone VLAN identifier of the encapsulated frame with "BVID1" (in this case, however, nothing is changed before and after the replacement).

Similarly, the table processing unit 16 receives the frame to which the destination port identifier {LP1_2} is added, and acquires the port identifier {PPh1} and the backbone VLAN identifier "BVID2" of the physical port PPh1 from the destination port identifier {LP1_2} based on the egress LP table 21b. The table processing unit 16 replaces the destination port identifier with the port identifier {PPh1} and further replaces the backbone VLAN identifier of the encapsulated frame with "BVID2".

The external interface unit 35 deletes unnecessary information added to the frames, and then transmits the two frames (encapsulated frames) MCFc1 and MCFc2 from the physical port PPh1 based on the destination port identifier. The encapsulated frame MCFc1 contains the source MAC address (SA) "MA1", the destination MAC address (DA) "MCA", the backbone VLAN identifier "BVID1" and the service instance identifier "ISID1".

In detail, the source MAC address (SA) contains "MA1" to be the source customer MAC address (CSA) and the MAC address of the relay device SW1 to be the source encapsulation MAC address (BSA). Also, the destination MAC address (DA) contains the destination customer MAC address (CDA) and the destination encapsulation MAC address (BDA) to be "MCA". In addition, the encapsulated frame MCFc2 is the same as the encapsulated frame MCFc1 except that the backbone VLAN identifier BVID is different.

Figure 12:
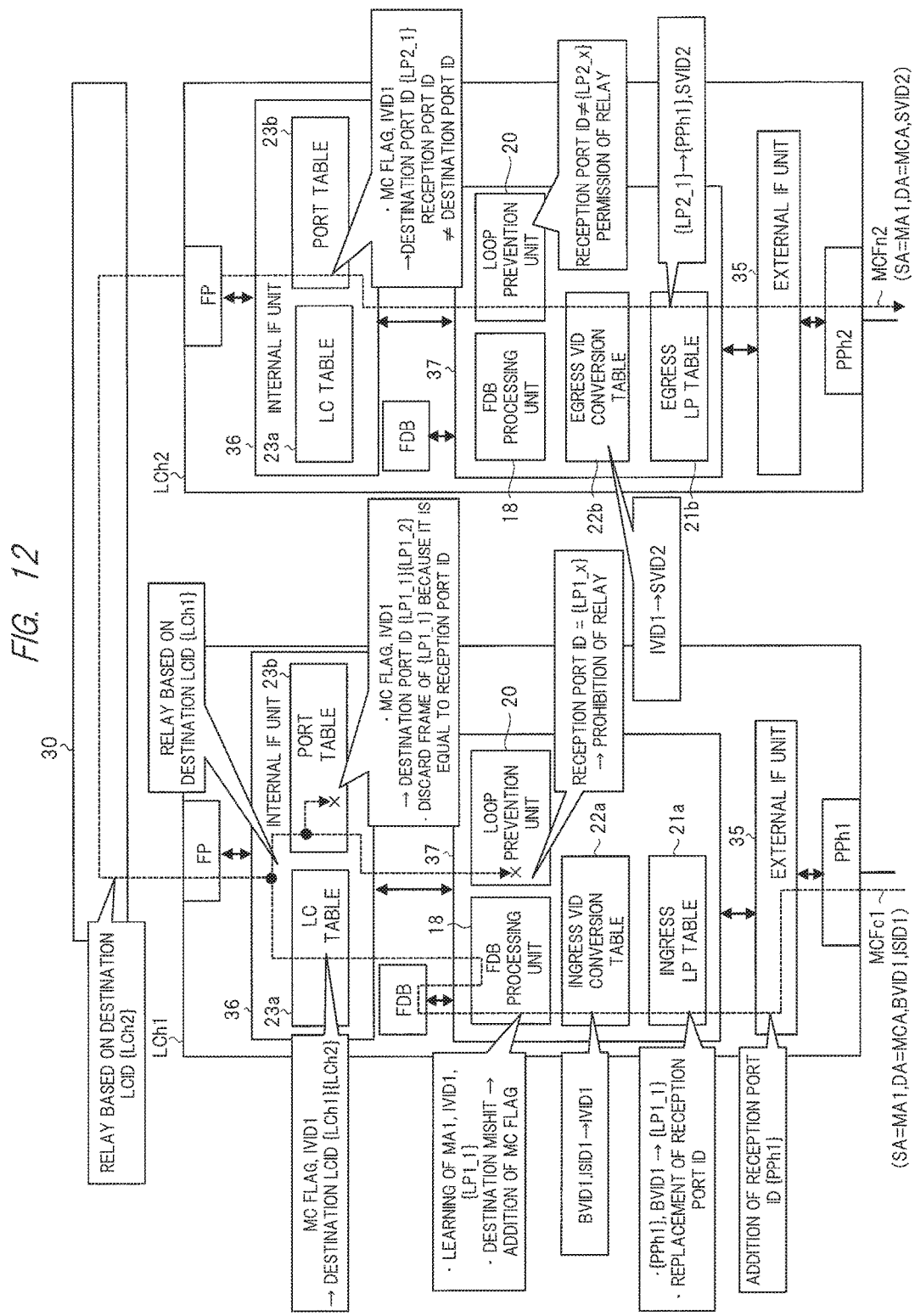
FIG. 12 is an explanatory diagram illustrating another schematic operation example in the case where the relay device of FIG. 8 is applied to the relay system of FIG. 5.

FIG. 12 is an explanatory diagram illustrating another schematic operation example in the case where the relay device of FIG. 8 is applied to the relay system of FIG. 5. FIG. 12 illustrates the operation example of the relay device SW2 in FIG. 5. In FIG. 12, first, the line card LCh1 receives the frame (encapsulated frame) MCFc1 from the relay device SW1 described with reference to FIG. 11 at the physical port PPh1.

The external interface unit 35 adds the reception port identifier {PPh1} to the received frame and then transmits it to the relay processing unit 37. In the relay processing unit 37, the table processing unit 16 acquires the port identifier {LP1_} of the logical, port LP1_1 from the reception port identifier {PPh1} and the backbone VLAN identifier "BVID1" based on the ingress LP table 21a, and replaces the reception port identifier with the port identifier {LP1_1}. The VID conversion unit 17 converts the backbone VLAN identifier "BVID1" and the service instance identifier "ISID1" into the internal VLAN identifier "IVID1" based on the ingress VID conversion table 22a, and adds them to the frame.

The FDB processing unit 18 learns the source MAC address "MA1" and the internal VLAN identifier "IVID1" of the frame in association with the reception port identifier {LP1_1} to the FDB. In detail, the FDB processing unit 18 learns "MA1" to be the source customer MAC address (CSA) and the MAC address BMAC of the relay device SW1 to be the source encapsulation MAC address (BSA) as the source MAC addresses.

Also, since the destination MAC address of the frame is "MCA", the FDB processing unit 18 adds the MC flag to the frame and transmits the frame to the internal interface unit 36. Since the frame to which the MC flag is added is received, the MC processing unit 19 in the internal interface unit 36 acquires the destination line card identifiers {LCh1} and {LCh2} corresponding to "IVID1" based on the LC table 23a. The MC processing unit 19 adds the destination line card identifiers {LCh1} and {LCh2} to the respective two replicated frames.

The MC processing unit 19 transmits the frame to which the destination line card identifier {LCh2} is added to the fabric path unit 30. Meanwhile, since the frame to which the destination line card identifier {LCh1} is added is destined for its own line card, the MC processing unit 19 processes the frame by the use of the port table 23b. Specifically, the MC processing unit 19 acquires the destination port identifiers {LP1_1} and {LP1_2} corresponding to "IVID1" based on the port table 23b.

Here, since the reception port identifier {LP1_1} is the same as the reception port identifier, the MC processing unit 19 eliminates it from the destination port. As a result, the MC processing unit 19 transmits the frame to which the destination port identifier {LP1_2} is added to the relay processing unit 37. Since the received frame corresponds to the relay between logical ports set for the physical port PPh1 of its own line card, the loop prevention unit 20 in the relay processing unit 37 prohibits the relay of the frame (for example, discards the frame). Specifically, the loop prevention unit 20 determines the relay between logical ports from the fact that the reception port identifier is {LP1_x}(x is an arbitrary integer).

Meanwhile, the frame relayed to the line card LCh2 via the fabric path unit 30 is received by the internal interface unit 36 of the line card LCh2. Since the frame to which the MC flag is added is received at the fabric terminal FP, the MC processing unit 19 of the internal interface unit 36 acquires the destination port identifier {LP2_1} corresponding to "IVID1" based on the port table 23b. Since the destination port identifier is different from the reception port identifier, the MC processing unit 19 adds the destination port identifier {LP2_1} to the frame and then transmits the frame to the relay processing unit 37.

Since the received frame does not correspond to the relay between logical ports set for the physical port PPh2 of its own line card, the loop prevention unit 20 in the relay processing unit 37 permits the relay of the frame. Specifically, the loop prevention unit 20 determines that the frame does not correspond to the relay between logical ports from the fact that the reception port identifier is not {LP2_x} (x is an arbitrary integer).

The VID conversion unit 17 converts the internal VLAN identifier "IVID1" contained in the frame into the service VLAN identifier "SVID2" based on the egress VID conversion table 22b. In more detail, the relay processing unit 37 includes a decapsulation executing unit. The decapsulation executing unit deletes the encapsulation portion of the frame (encapsulated frame) to generate a non-encapsulated frame containing the service VLAN identifier "SVID2".

The table processing unit 16 receives the frame to which the destination port identifier {LP2_1} is added, and then acquires the port identifier {PPh2} and the service VLAN identifier "SVID2" of the physical port PPh2 from the destination port identifier {LP2_1} based on the egress LP table 21b. The table processing unit 16 replaces the destination port identifier with the port identifier {PPh2} and further replaces the service VLAN identifier of the non-encapsulated frame with "SVID2" (in this case, however, nothing is changed before and after the replacement).

The external interface unit 35 deletes unnecessary information added to the frame, and then transmits the frame (non-encapsulated frame) MCFn2 from the physical port PPh2 based on the destination port identifier. The non-encapsulated frame MCFn2 contains the source MAC address (SA) (in other words, source customer MAC address (CSA)) "MA1", the destination MAC address (DA) (in other words, destination customer MAC address (CDA)) "MCA" and the service VLAN identifier "SVID2".

In FIG. 11 and FIG. 12, in the learning of the FDB, in order to synchronize the contents retained in the FDBs of the respective line cards, for example, the learning frame containing only a header portion of the received frame is used. In the example of FIG. 11, the relay processing unit 37 of the line card LCh2 generates the learning frame and transmits it to all the line cards except its own line card. The relay processing unit 37 of each line card which has received the learning frame learns the source information contained in the learning frame to the FDB of its own line card.

In addition, the low-bandwidth line card LC11 illustrated in FIG. 8 does not include the table processing unit 16 and the loop prevention unit 20 of FIG. 9, and is configured to perform the same process as that in FIG. 11 and others based on the port identifier of a physical port instead of that of a logical port. For example, the FDB processing unit 18 in the line card LC11 learns the MAC address and the internal VLAN identifier IVID in association with the port identifier of the physical port (for example, {PP11}) to the FDB. Accordingly, as illustrated in FIG. 10C, the port identifier of a logical port and the port identifier of a physical port are present in a mixed manner in the FDB in each line card. However, the FDB processing unit 18 in each line card can handle the port identifier of a physical port and the port identifier of a logical port without particularly discriminating them. Thus, the simplification of the process can be achieved.

As described above, by using the relay device according to the second embodiment, various advantages described in the first embodiment can be obtained in the efficient mechanism using the chassis-type L2 switch. For example, by making the loop prevention unit 20 function in the line card on the egress side, the loop can be efficiently prevented.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, the relay system in which the PBB network 11 is used and the path is selected by the backbone VLAN identifier BVID has been taken as an example, but it is not always necessary to use the PBB network 11, and the relay system in which the path is selected by the use of a general VLAN identifier is also applicable. In addition, although an L2 switch is taken as an example of the relay device here, a layer 3 (L3) switch for performing an L3 processing in addition to the L2 processing of the OSI reference model is also applicable.

What is claimed is:

1. A relay device comprising:
a physical port;
a logical port table which retains a combination of the physical port and a VLAN identifier in association with a logical port;
a table processing unit which acquires the logical port based on the logical port table when a frame is received at the physical port;
an FDB (Forwarding DataBase);
an FDB processing unit which learns a source MAC address contained in the received frame in association with the logical port acquired by the table processing unit to the FDB;
a loop prevention unit;
a VID conversion unit which converts a VLAN identifier contained in the received frame into an internal VLAN identifier; and
a multicast processing unit which retains a correspondence relation between the internal VLAN identifier and the logical port or a plurality of logical ports, and determines the logical port or the plurality of logical ports to be a destination or destinations based on the internal VLAN identifier of the frame when the received frame is a multicast frame, wherein
the plurality of the logical ports are set for the physical port by the logical port table, and
the loop prevention unit prohibits frame relay between the plurality of logical ports set for the physical port.

2. A relay device comprising:
a physical port;
a logical port table which retains a combination of the physical port and a VLAN identifier in association with a logical port;
a table processing unit which acquires the logical port based on the logical port table when a frame is received at the physical port;
an FDB (Forwarding DataBase);
an FDB processing unit which learns a source MAC address contained in the received frame in association with the logical port acquired by the table processing unit to the FDB; and
a loop prevention unit, wherein
a plurality of the logical ports are set for the physical port by the logical port table,
the loop prevention unit prohibits frame relay between the plurality of logical ports set for the physical port,
the physical part is one of a plurality of physical ports for which the logical ports can be set, and
the loop prevention unit can set whether frame relay between the plurality of logical ports is prohibited for each of the plurality of physical ports.

3. A relay system comprising a plurality of relay devices connected via communication lines,
wherein a first relay device which is at least one of the plurality of relay devices includes:
a physical port connected to other relay devices via the communication lines;
a logical port table which retains a combination of the physical port and a VLAN identifier in association with a logical port;
a table processing unit which acquires the logical port based on the logical port table when a frame is received at the physical port;
an FDB (Forwarding DataBase);
an FDB processing unit which learns a source MAC address contained in the received frame in association with the logical port acquired by the table processing unit to the FDB; and
a loop prevention unit,
wherein a plurality of the logical ports are set for the physical port by the logical port table,
the loop prevention unit prohibits frame relay between the plurality of logical ports set for the physical port,
the physical port of the first relay device is connected to at least a second relay device and a third relay device,
the second relay device is connected to the third relay device without interposing the first relay device,
the logical port table of the first relay device retains two of the logical ports connected to the second relay device and the third relay device, and
the loop prevention unit of the first relay device prohibits frame relay between the two logical ports.

4. The relay system according to claim 3, wherein the first relay device further includes:
a VID conversion unit which converts a VLAN identifier contained in the received frame into an internal VLAN identifier; and
a multicast processing unit which retains a correspondence relation between the internal VLAN identifier and the logical port or the plurality of the logical ports, and determines at least one of the logical ports to be a destination based on the internal VLAN identifier when the received frame is a multicast frame.

5. The relay system according to claim 4, wherein the same internal VLAN identifier is set to the two of the logical ports connected to the second relay device and the third relay device.

* * * * *